United States Patent

[11] 3,548,973

[72] Inventor Bernard Laverdant
 Vincennes, France
[21] Appl. No. 775,253
[22] Filed Nov. 13, 1968
[45] Patented Dec. 22, 1970
[73] Assignee Societe Anonyme D.B.A.
[32] Priority Nov. 15, 1967
[33]  France
[31]  No. 128,217

[54] STIRRUP FOR DISC BRAKE
 2 Claims, 3 Drawing Figs.
[52] U.S. Cl. .................................................. 188/72.5
[51] Int. Cl. ................................................ F16d 55/228
[50] Field of Search ......................................... 188/73,
  73CL

[56] References Cited
 UNITED STATES PATENTS
3,199,633 8/1965 Rodway ....................... 188/73(CL)

3,199,634 8/1965 Chouings ...................... 188/73(CL)
3,269,491 8/1966 Belart et al. .................. 188/73
  FOREIGN PATENTS
966,198 8/1964 Great Britain ................ 188/73(CL)
Primary Examiner—George E. A. Halvosa
Attorneys—C. F. Arens and Plante, Arens, Hartz, Hix and Smith ABSTRACT: A disc brake for an automotive vehicle in which a two-piece caliper is used. One piece of the caliper includes the bridge portion that straddles the rotor of the brake and includes a pair of arms that extend outwardly from the bridge portion, thereby forming a U-shaped member presenting an open end between the arms. The other piece of the caliper includes a piston and cylinder assembly having lugs formed thereon that are slidably received in grooves formed in the arms. A releasable locking device is provided to secure the piston and cylinder assembly to the arms.

STIRRUP FOR DISC BRAKE

The present invention relates to a caliper or stirrup for a disc brake either of floating or fixed type and provided with either one or several braking actuators.

The advantages presented by the composite stirrup with respect to the one-piece stirrup are well known, for instance the machining steps can be chosen more specifically respectively for the brake actuator and for the body of the stirrup. Furthermore in a composite stirrup, it is possible to make the braking actuator cylinder of aluminum or of a light alloy easy to machine and having good heat conductivity characteristics and to make the body of the stirrup of a ferrous alloy having a good mechanical resistance particularly with respect to tensile strength.

With a view to connecting the brake actuator with the body of the stirrup, it has been suggested to use studs or screws, the tightening of the studs or of the screws insuring the rigid connection of the parts of the composite stirrup.

In these known devices, high stresses are generated in said screws or studs due to the differential expansion resulting from the heating during the braking operation, said screws or studs being generally submitted to shearing stresses upon the application of the braking pressure to the brake actuators.

The present invention relates to a composite stirrup for a disc brake permitting to avoid these drawbacks.

The composite stirrup according to the invention is of the type in which one brake actuator at least urges at least one of the two pads toward the disc, said brake actuator being connected to the body of the stirrup by means of a tenon and mortise joint or the same extending substantially parallely to the surface of the disc.

According to another feature of the invention, the brake actuator is provided on its external cylindrical wall, with two parallel and diametrically opposed projections cooperating with two parallel grooves formed on the body of the stirrup, said grooves being located in a plane parallel to the disc, said projections and grooves being portions of a cylinder or portions of a prism.

According to still another feature of the invention, locking means are provided to prevent said brake actuator from sliding with respect to the stirrup. The locking operation is effected in a very simple manner after having suitably located the brake actuator in the stirrup.

Other advantages and features of the invention will appear from the following description taken in connection with the accompanying drawings in which.

Figure 1:
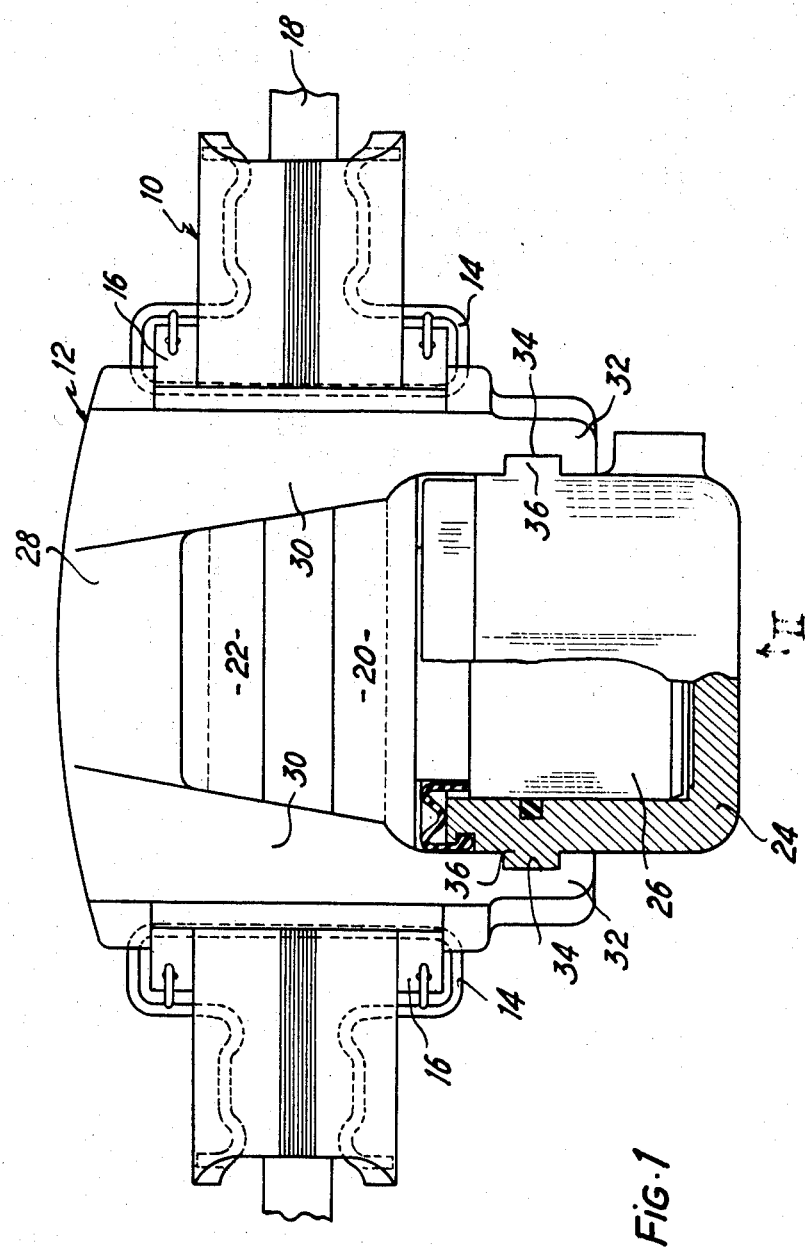
FIG. 1 is a top view of a disc brake according to the invention.

The disc brake provided with a sliding stirrup of FIG. 1 is of the same type than the disc brake disclosed in my U.S. Pat. No. 3,368,647 for "spot type disc brakes and disc brake friction pads." It comprises slidably mounted on a U-shaped fixed support 10 surrounding the disc, a stirrup 12 radially urged outwardly by springs 14. Key bolts 16 are inserted between support 10 and stirrup 12.

The stirrup 12 has a general shape of a double U member straddling the disc. It causes the squeezing of the disc between two pads 20 and 22 when braking liquid under pressure is introduced into the wheel cylinder or brake actuator 24. Pad 20 is applied against 18 by the displacement of the piston 26 in the cylinder of the actuator 24. Pad 22 is applied by reaction, thanks to the portion 28 of the stirrup 12 located on the opposite side of the disc with respect to the side on which acts the actuator 24. The connection between the reaction portion 28 and the actuator 24 is effected by the two arms 30 straddling the disc. The free ends 32 of the arms 30 are bent at 90° with respect to the latter and comprise grooves 34 parallel to one another and symmetrically located with respect to the plane containing the axis of the actuator 24 and the axis of the disc 18. The actuator 24 is provided with diametrically extending projections 36 the shape of which is complementary to one of the grooves 34 so that the actuator can be engaged in the body of the stirrup by radially sliding said actuator.

On the drawing are illustrated parallelepipedic projections 36 cooperating with grooves 34 having a corresponding shape, but of course the groove section may have any shape. For instance the grooves can be portions of a prism or of a cylinder. The connection can also be effected in the form of a dove-tail structure.

The wheel cylinder 24 is secured with respect to the stirrup 12, in a suitable position, so that the axis of piston 26 is intersecting the pad 20 at its center of pressure.

The securing of the wheel cylinder 24 with respect to the stirrup 12 can be effected by means of a screw, the threads of which cooperate with the threads of a threaded hole provided on the bent portion 32 of one of the arms 30 the end portion of which is applied against the wheel cylinder 24.

Figure 2:
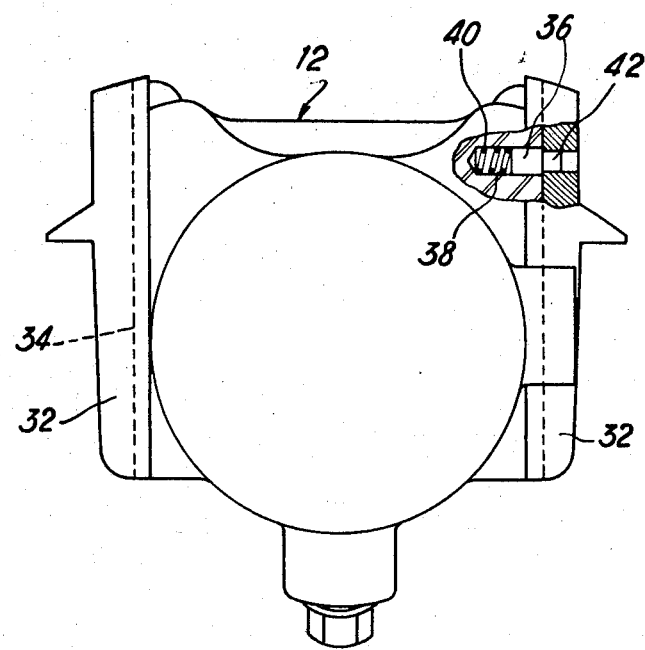
FIG. 2 is an end view in the direction of arrow II of FIG. 1 of the composite brake stirrup illustrated in FIG. 1

It is likewise possible to use, as shown on FIG. 2, a stepped plunger 36 the end portion of which of a larger diameter is adapted to slide in a cylindrical drilling 38 provided in the wall of cylinder 24, a prestressed spring 40 disposed in the drilling 38 urging said stepped plunger 36 so that the end portion of the latter of a smaller diameter projects into a drilling 44 of a corresponding diameter provided in the end portion 32 of the stirrup 12. The use of the stepped plunger 36, permits an easy mounting of the cylinder 24 in the stirrup 12, the positioning being defined by the location of drilling 44.

In a preferred embodiment, the wheel cylinder and its piston are made of aluminum or of a light alloy while the stirrup body is made of steel or cast iron.

According to the specific uses of the stirrup which has been described, wheel cylinders having different diameters for a given stirrup body are selected.

Figure 3:
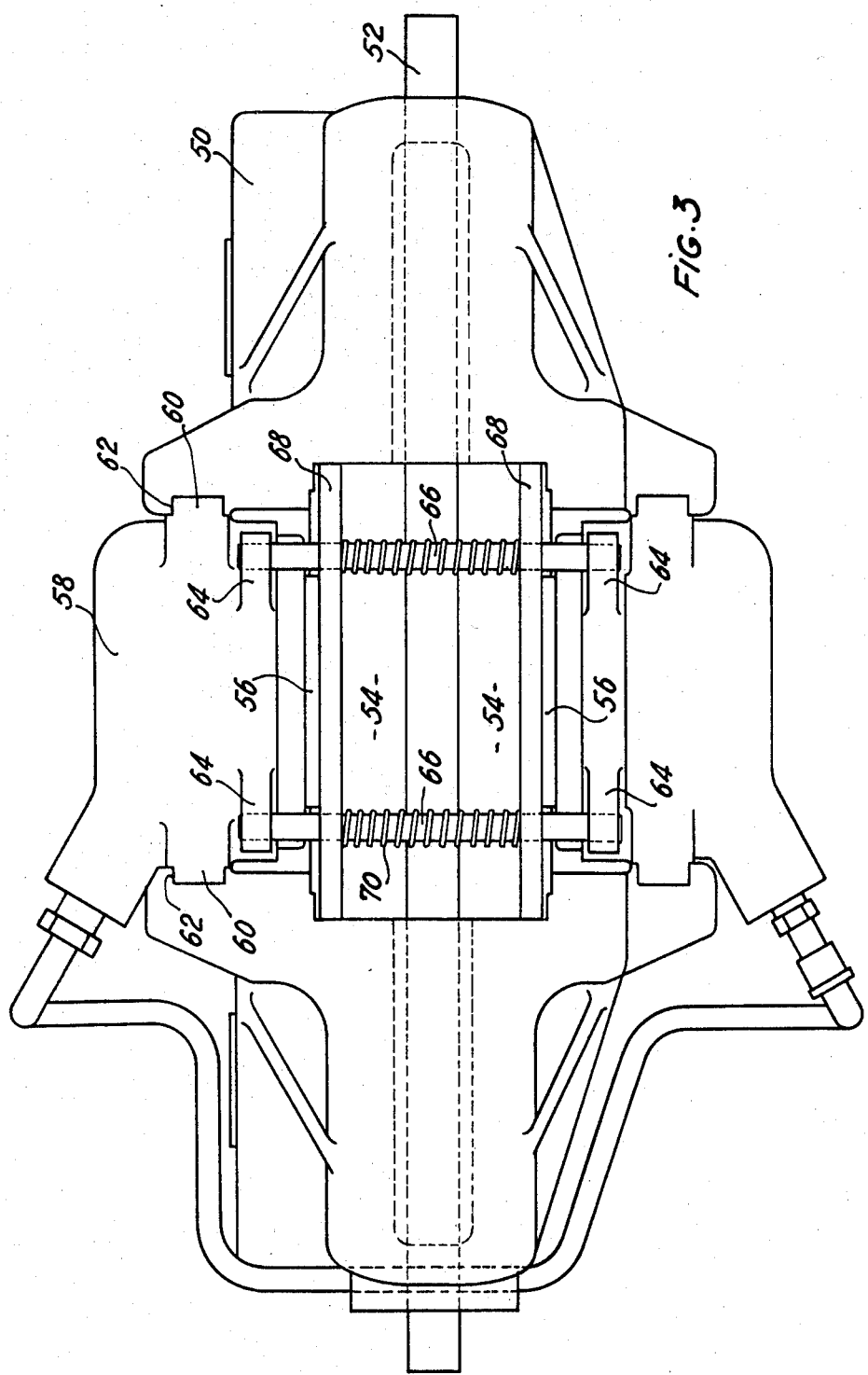
FIG. 3 is a top view of a brake comprising a fixed stirrup and provided with the improvements of the present invention.

A disc brake having a fixed stirrup is illustrated in FIG. 3. Said brake comprises a stirrup 50 integral with a part of a vehicle which is fixed with respect to the wheel driving the disc 52 surrounded by said stirrup. Pads 54 symmetrically disposed on both sides of the disc 52 are urged against the latter by the opposite pistons 56 of two brakes actuators 58. The outer walls of the actuators 58 are provided with diametrically opposed parallely extending flange portions 60 cooperating with corresponding grooves 62 provided in the fixed stirrup 50 and extending parallel to the plane containing the aligned cylinder axes 58 and the axis of the disc 52 and also extending parallel to the plane of the disc.

In the embodiment shown in FIG. 3, each braking actuator 58 is provided with two lugs 64 connected to those of the opposed actuator by axially extending pins supporting the pads by their backing plates 68 provided with holes. Prestressed springs 70 surrounding pins 60 urge the pads away from one another.

Same remarks are still available concerning the shape of the flange portions 60, the grooves 62 as in the case of the stirrup illustrated in FIGS. 1 and 2. However, it is to be noted that the composite structure according to the invention using parallel connections of the type tenon and mortise extending substantially radially and parallely to the plane of the disc, permits not only to use wheel cylinders, the pistons and cylinders of which may have diameters chosen as a function of the desired braking force, but furthermore permits the use of the same stirrup for discs having different diameters, the positioning of the brake actuators being effected radially, as requested by the size of said discs.

The invention is not to be limited to the above described and illustrated embodiments; for instance it is possible to consider as in the scope of the present invention floating or sliding reaction stirrups comprising more than one brake actuator and fixed stirrups comprising more than two brake actuators or comprising two opposed actuators which are not axially aligned.

I claim:

1. In a disc brake:
   a rotor having a pair of opposed friction faces;

a pair of friction elements, one of said elements being disposed adjacent each of said friction faces;

a caliper operably connected to each of said friction elements for urging the latter toward a corresponding friction face;

said caliper including a bridge portion straddling said rotor;

arm means extending from said bridge portion, said arms means and said bridge portion forming a generally U-shaped member presenting an open end;

brake actuating means slidably received within said open end;

one of said means having groove means formed therein;

the other means having lug means projecting therefrom adapted to be slidably received in said groove means;

a locking device for securing said actuating means to said arm means; and said locking device including a bore in one of said means, a plunger slidable in said bore, a recess in the other means, and a resilient member in said bore yieldably urging the plunger toward the recess when the brake actuating means is installed in said open end.

2. In a disc brake:

a rotor having a pair of opposed friction faces;

a pair of friction elements, one of said elements being disposed adjacent each of said friction faces;

a caliper operably connected to each of said friction elements for urging the latter toward a corresponding friction face;

said caliper including a bridge portion straddling said rotor;

arm means extending from said bridge portion, said arm means and said bridge portion forming a generally U-shaped member presenting an open end;

brake actuating means slidably received within said open end;

one of said means having groove means formed therein;

the other means having lug means projecting therefrom adapted to be slidably received in said groove means;

said brake actuating means including a piston and cylinder assembly;

said arm means including a pair of arms engaging opposite sides of said cylinder;

said groove means being a groove extending through each of said arms in a direction substantially parallel to the friction faces;

said lug means being a pair of projections extending from opposite sides of the cylinder for sliding engagement with said grooves;

a locking device for securing said actuating means to said arm means; and said locking device including a bore in one of said means, a plunger slidable in said bore, a recess in the other means, and a resilient member in said bore yieldably urging the plunger toward the recess when the brake actuating means is installed in said open end.